Dec. 22, 1964  H. O. SHORT  3,162,268
LUBRICATOR FOR A MOTION-TRANSLATING MECHANISM
Filed Aug. 22, 1962  2 Sheets-Sheet 1
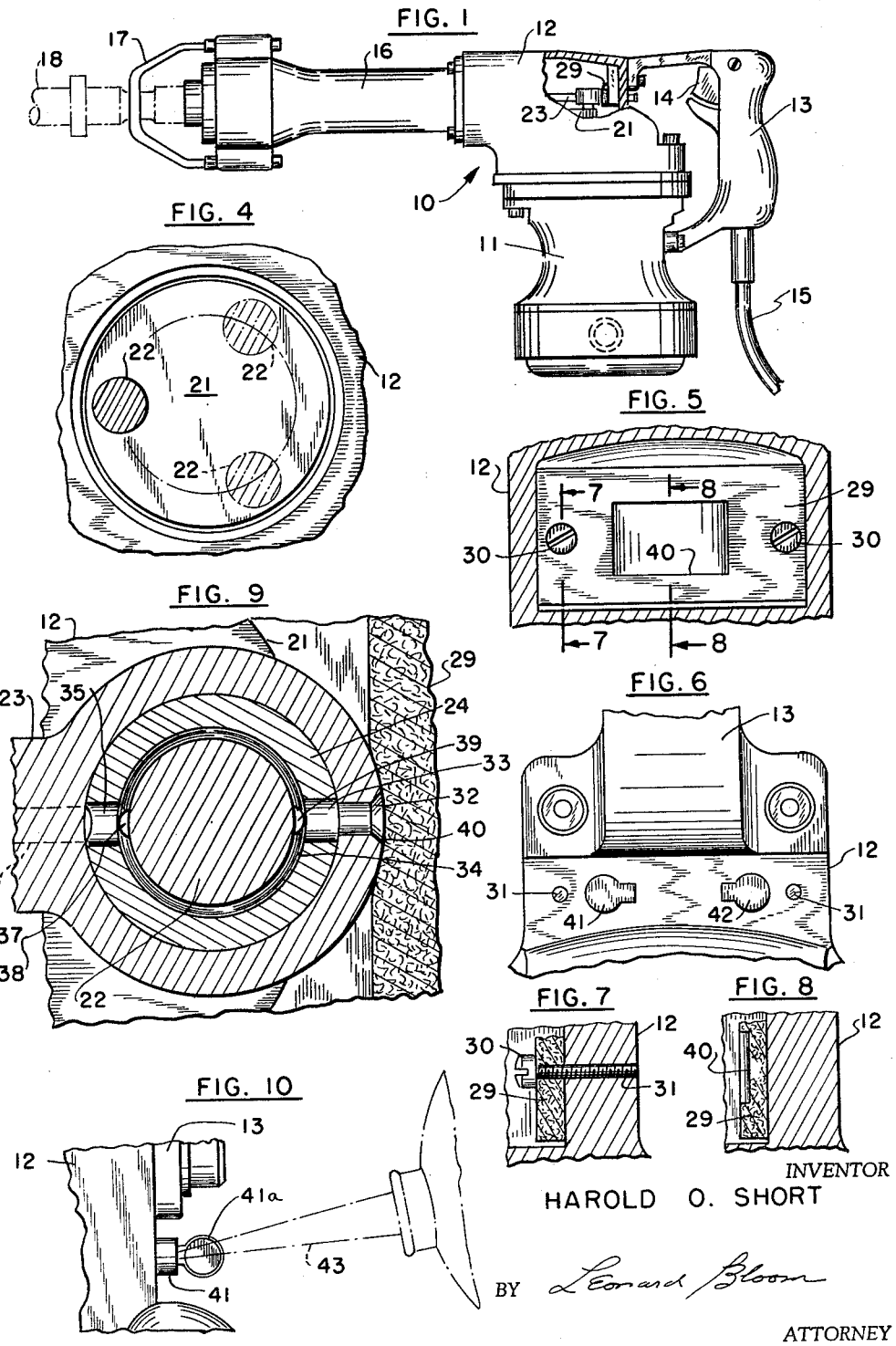
INVENTOR
HAROLD O. SHORT
BY Leonard Bloom
ATTORNEY Dec. 22, 1964  H. O. SHORT  3,162,268
LUBRICATOR FOR A MOTION-TRANSLATING MECHANISM
Filed Aug. 22, 1962  2 Sheets-Sheet 2
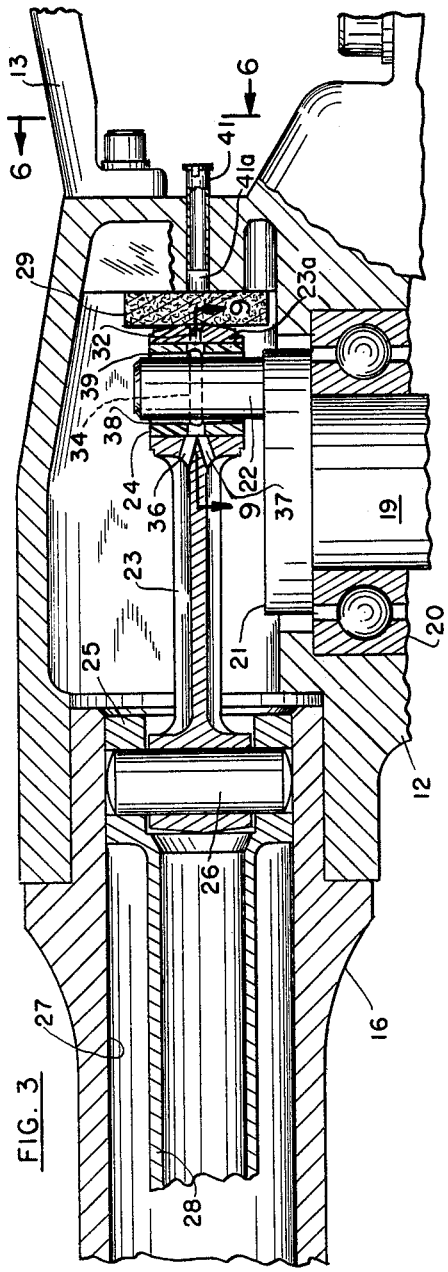
INVENTOR
HAROLD O. SHORT
BY Leonard Bloom
ATTORNEY United States Patent Office 3,162,268
Patented Dec. 22, 1964

3,162,268
LUBRICATOR FOR A MOTION-TRANSLATING MECHANISM
Harold O. Short, Towson, Md., assignor to The Black and Decker Manufacturing Company, Towson, Md., a corporation of Maryland
Filed Aug. 22, 1962, Ser. No. 218,678
1 Claim. (Cl. 184—5)

The present invention relates to a lubricator for a motion-translating mechanism, and more particularly, to such a mechanism used in a portable power-operated tool and comprising a rotating crankshaft, a crank pin carried by the crankshaft, a connecting rod mounted upon the crank pin, the connecting rod having a free end having a cross-head mounted thereon, and a connecting rod bearing, preferably of the sleeve type, between the connecting rod and the crank pin.

It is an object of the present invention to provide such a lubricator which is relatively inexpensive, which will enhance the life and reliability of the motion-translating mechanism, and which may be assembled quickly and easily in the device in which it and the mechanism are used.

One such device, within which the teachings of the present invention may find more particular utility, is a portable electric hammer of the type which may be hand carried and held by an operator in usage. Such a tool develops in the neighborhood of 2500 blows per minute and is capable of performing a variety of demolition jobs and rock drilling, as for example, drilling a 2 inch diameter hole, roughly 4 inches deep, in a solid block of concrete in approximately 1 minute. As will be appreciated by those skilled in the art, it is desirable that the wearing components of the motion-translating mechanism used in the tool be lubricated properly for long life, durability, and trouble-free performance.

In accordance with the teachings of the present invention, a housing is provided for the hammer or other device; and a motion-translating mechanism, as described above, is included therein. A stationary lubricant applicator, such as an oil pad or wick, is retained in the housing. This oil wick is disposed radially of the crank pin and within the zone of travel of the connecting rod, so that the head of the connecting rod may wipe against the oil wick once per revolution of the crankshaft. A canal is formed in the connecting rod head opposite from the free end thereof, and a first duct is formed in the connecting rod bearing to communicate with the canal in the connecting rod. An internal annular recess is formed in the bearing, and a second duct is formed in the bearing to communicate with the first duct by means of the internal annular recess. At least one passageway is formed in the connecting rod. This passageway is on the side of the crank pin which is opposite from the canal formed in the connecting rod, it communicates with the second duct in the connecting rod bearing, and it terminates at the outer surface of the connecting rod. Consequently, the lubricant which is picked up by the connecting rod, as its head engages or wipes against the stationary oil wick, is allowed to flow through the connecting rod and through the connecting rod bearing to lubricate not only those parts but also the crank pin as well. The passage of the lubricant is from the oil wick into the canal formed in the connecting rod, thence into the first duct in the connecting rod bearing, thence via the internal annular recess into the second duct in the connecting rod bearing, and thence into the passageway formed in the connecting rod and on out to the outer surface of the connecting rod. Moreover, and preferably, means are also provided to allow the lubricant to flow longitudinally or axially with respect to the crank pin, and further means are provided to replenish the supply of lubricant in the applicator from time-to-time as is needed.

These and other objects of the present invention will become apparent from a reading of the following specification, taken in conjunction with the enclosed, drawings, in which:

FIGURE 1 is a side elevational view of a typical device, in this case a portable electric hammer or percussive tool, in which the teachings of the present invention may find particular utility, parts being broken away and sectioned to illustrate the essence of the present invention;

FIGURE 2 is an enlarged longitudinal section of a portion of FIGURE 1, showing the motion-translating mechanism in its downstroke or advance stroke, and further showing the stationary oil wick retained in the housing, an oil fitting being provided to allow the supply of lubricant in the wick to be replenished;

FIGURE 3 is a longitudinal section, corresponding substantially to that of FIGURE 2, but showing the motion-translating mechanism at the end of its travel, such that the connecting rod may contact or wipe against the oil wick;

FIGURE 4 is a section view taken along the lines 4—4 of FIGURE 2, showing the crank and crank pin, with the broken lines indicating some of the alternate positions of the rotating crank pin;

FIGURE 5 is an elevational view taken along the lines 5—5 of FIGURE 2, showing the oil wick in plan view, and further showing how the oil wick will have a central depression formed therein after repeated usage;

FIGURE 6 is an elevational view taken along the lines 6—6 of FIGURE 3, showing the oil fittings which are used to replenish the supply of lubricant in the wick;

FIGURE 7 is a section view taken along the lines 7—7 of FIGURE 5, showing one of the retaining screws for securing the oil wick to the housing;

FIGURE 8 is a section view taken along the lines 8—8 FIGURE 5, showing the central depression which is formed in the wick;

FIGURE 9 is a section view taken along the lines 9—9 of FIGURE 3, showing the canal and passageways which are formed in the connecting rod, and further showing the pair of ducts and the internal annular recess which are formed in the connecting rod bearing, to accommodate the flow of lubricant through these parts and around the crank pin; and FIGURE 10 shows the operation of replenishing the supply of lubricant in the oil wick.

With reference to FIGURE 1, there is illustrated a portable electric hammer 10 which is indicative of the type of device within which the teachings of the present invention may find more particular utility, although it will be appreciated that the essence of the present invention is not necessarily to be limited thereby. With this in mind, the hammer 10 comprises a motor housing 11, a gear case 12 secured on top of the motor housing 11, a switch handle 13 having an electric switch 14 and further having a conventional electric line 15, a barrel 16 secured forwardly of the gear case 12, and a tool retainer 17 for use with a conventional tool bit 18.

With reference to FIGURES 2 and 3, the hammer 10 utilizes a motion-translating mechanism which includes a crankshaft 19 journaled in the housing or gear case 12 by means of a ball bearing 20. The crankshaft 19 carries a crank 21, which in turn carries a crank pin 22; and a connecting rod 23, which develops approximately 2500 strokes per minute, is mounted upon the crank pin 22. A connecting rod bearing 24, preferably of the sleeve type, is disposed between the crank pin 22 and the connecting rod 23. The free end of the connecting rod 23 is mounted in a cross-head 25 by means of a wrist pin 26. The crosshead 25 is slidably fitted within the bore 27 of the barrel 16, and a piston rod 28 is formed integrally with the crosshead 25. The piston rod 28 may then have a suitable piston formed thereon so as to actuate a floating ram. The piston and ram, being conventional, are omitted herein for ease of illustration; however, it will be understood by those skilled in the art that the ram supplies the percussive driving force for the end of the tool bit 18.

With reference again to FIGURES 2 and 3, and with further reference to FIGURES 5 and 6, a lubricant applicator, such as an oil pad or wick 29, is secured in the housing of the gear case 12 by means of a pair of retaining screws 30, which engage respective threaded holes 31 formed in the gear case 12. As is shown more clearly in FIGURE 3, the connecting rod head 23a may wipe against or engage the oil wick 29 once per revolution of the crankshaft 19 and at the end of travel of the crank pin 22.

With further reference to FIGURE 9, a canal 32 is formed in the head of the connecting rod 23 which engages the oil wick 29. A first duct 33 is formed in the connecting rod bearing 24 to communicate with the canal 32 formed in the head of the connecting rod 23. An internal annular recess 34 is formed in the connecting rod bearing 24; and a second duct 35, which is diametrically opposite from the first duct 33, is also formed in the connecting rod bearing 24. The second duct 35 communicates with the first duct 33 by means of the internal annular recess 34. Moreover, and as shown in FIGURES 2 and 3, a pair of passageways 36 and 37 are formed in the connecting rod 33. Each of the passageways 36 and 37 communicates with the second duct 35 which is formed in the connecting rod bearing 24. Moreover, the passageways 36 and 37 diverge with respect to each other, with the one passageway 36 terminating at the outer surface on the top of the connecting rod 23, and with the other passageway 37 terminating at the outer surface on the bottom of the connecting rod 23.

Consequently, it will be appreciated that the lubricant that is picked up by the head of the connecting rod 23, as it wipes against the oil wick 29 once per revolution of the crankshaft 19, is allowed to flow into the canal 32 formed in the head of the connecting rod 23, thence into the first duct 33 formed in the connecting rod bearing 24, thence via the internal annular recess 34 into the second duct 35 which is also formed within the connecting rod bearing 24, and thence into the passageways 36 and 37 formed in the connecting rod 23, and on out to the outer surface of the connecting rod 23, thereby lubricating the wearing surfaces of the connecting rod 23, of the connecting rod bearing 24, and of the crank pin 22.

Moreover, to facilitate the lubrication of the crank pin 22, a pair of diametrically-opposite internal longitudinal canals 38 and 39 are formed in the connecting rod bearing 24, one on each side of the crank pin 22, as is shown in FIGURES 2, 3, and 9. Each of the canals 38 and 39 communicates with the internal annular recess 34 which is formed in the connecting rod bearing 24, thereby allowing the lubricant to pass axially or longitudinally along the crank pin 22. Furthermore, and as shown in FIGURES 5 and 8, the oil wick 29 will have a central depression 40 formed therein after repeated usage, that is, after a number of engagements or contacts with the connecting rod 23. This depression 40 may, if desired, be formed initially in the oil wick 29.

With reference to FIGURES 2, 3 and 6, means are provided to occasionally replenish the supply of lubricant in the oil wick 29. This means may take the convenient form of a pair of oil cups or fittings 41 and 42, which are standard components, and which are secured in respective ducts, such as 41a, formed in the housing of the gear case 12. As shown more particularly in FIGURE 10, the lid 41a of oil fitting 41 may be lifted so that the tip 43 of a conventional oil can may be inserted within the fitting 41 (or within fitting 42) so as to replenish the supply of lubricant in the wick 29 via the respective duct formed in the housing.

As previously noted, the connecting rod 23 acquires lubricant by means of its repeated engagement with the stationary oil wick 29, and this lubricant penetrates within the wearing components of the motion-translating mechanism by means of the aforementioned canals, ducts, and passageways, etc.; and moreover, by reason of the crosshead 25 reciprocating in the bore 27 of the cylindrical barrel 16, and especially by reason of the relatively high-speed of the motion-translating mechanism and the changes in air pressure which are continuously developed, the lubricant which is picked up by the connecting rod 23 becomes atomized or forms a spray within the upper confines of the gear case 12, with the result that a coating or a film of oil becomes deposited on the wearing components of the mechanism and thus insures their long-life and relatively trouble-free performance even under high-speed and heavily-loaded conditions.

Obviously, many modifications may be made without departing from the basic spirit of the present invention; and accordingly, within the scope of the appended claim, the invention may be practiced other than has been specifically described.

I claim:

In a portable power-operated tool having a housing and a motion-translating mechanism comprising a rotating crankshaft journaled in the housing, a crank pin carried by the shaft, a bearing on the pin, and a connecting rod having a head mounted on the bearing; lubrication means comprising:

(a) a lubricant applicator retained within the housing radially of the crank pin and within the zone of travel of the connecting rod, whereby the head of the rod may wipe against said applicator once per revolution of the crankshaft;

(b) means including a duct formed in the housing and leading to said applicator to replenish the supply of lubricant in the applicator from an external source;

(c) a canal formed in the head of the connecting rod to communicate said applicator with the external surface of the bearing;

(d) a first duct formed in the bearing and communicating with said canal in the head of the connecting rod;

(e) a second duct formed in the bearing diametrically opposite to said first duct;

(f) an internal annular recess formed in the bearing between said first and second ducts;

(g) a pair of internal longitudinal canals formed within the bearing diametrically opposite to one another, one each of said longitudinal canals communicating with a respective one of said ducts; and (h) a pair of passageways formed in the connecting rod head, diverging with respect to each other, communicate with said second duct in the bear in, and terminating at the outer surface of the connecting rod.

References Cited in the file of this patent

UNITED STATES PATENTS

| | | |
|---|---|---|
| 1,426,918 | Shover | Aug. 22, 1922 |
| 2,047,730 | Fleckenstein | July 14, 1936 |
| 2,268,319 | Barron | Dec. 30, 1941 |
| 2,283,292 | Smith | May 19, 1942 |
| 2,869,231 | Gury | Jan. 20, 1959 |
| 3,023,743 | Schauer | Mar. 6, 1962 |